United States Patent [19]
Gopfert et al.

[11] 3,783,794
[45] Jan. 8, 1974

[54] MAGNETIC SUSPENSION SYSTEM FOR VEHICLES AND THE LIKE WITH NON CONTROLLED SUSPENDING MAGNETS

[75] Inventors: Max Gopfert; Rudolf Gebhardt, both of Munich, Germany

[73] Assignee: Krauss-Maffei AG, Munich, Germany

[22] Filed: July 24, 1972

[21] Appl. No.: 274,454

[30] Foreign Application Priority Data
July 28, 1971   Germany.................. P 21 37 691.0

[52] U.S. Cl.......................................... 104/148 MS
[51] Int. Cl............................................. B61b 13/08
[58] Field of Search............................. 104/148 LM

[56] References Cited
UNITED STATES PATENTS
3,589,300   6/1971   Wipf............................. 104/148 SS
3,611,944   10/1971   Reder........................... 104/148 MS

*Primary Examiner*—Gerald M. Forlenza
*Assistant Examiner*—George F. Abraham
*Attorney*—Karl F. Ross et al.

[57] ABSTRACT

A magnetic-suspension system for vehicles and the like adapted to travel along a track provided with a fixed armature rail of magnetically permeable—ferromagnetic—material. The suspended vehicle comprises, on a portion of the vehicle confronting the rail and therebelow, controlled electromagnets which regulate the suspension force and, adjacent the controlled electromagnets and preferably alternating therewith, uncontrolled suspending magnets which provide a substantial proportion of the suspension force.

10 Claims, 5 Drawing Figures

3,783,794

MAGNETIC SUSPENSION SYSTEM FOR VEHICLES AND THE LIKE WITH NON CONTROLLED SUSPENDING MAGNETS

FIELD OF THE INVENTION

The present invention relates to magnetic suspension systems and, more particularly, to a controlled electromagnetic suspension for a vehicle adapted to travel along a track upon which the vehicle is suspended.

BACKGROUND OF THE INVENTION

With the increasing need for high-speed mass transportation, considerable effort has been expended in developing low-friction or frictionless systems for moving, guiding and supporting vehicles along roadways or tracks. In such systems, attention has been directed to the use of magnetic force to suspend a vehicle from the track because of the low noise and simplicity of such systems by comparison with air-suspension and like arrangements.

In a magnetically-suspended vehicle, the track extends generally in the direction of vehicle travel and may be elevated above the ground, while the vehicle is provided with a supporting portion underlying and confronting a fixed magnetically permeable armature or rail mounted upon the track or its support and carrying electromagnets which may be energized to increase or decrease the suspending force.

In such systems the electromagnets may be provided in one or more rows, extending in the direction of movement of the vehicle, the rows being spaced apart in order to stabilize the vehicle and cooperating with respective armature rails extending along the support.

Each of the electromagnets may consist of a core or yoke carrying one or more electromagnetically energizable coils which, when energized, produce a magnetic field within the respective core and passing through the armature while closing between a pair of airgaps separating the core from the armature rail. The gap distance is adjusted by increasing or decreasing the electrical energization of the coils with respect to the load applied to the suspension. While the prior-art systems of this type have significant advantages over friction suspension systems using wheels, cables, chains and the like, in reduction of friction drag and wear of moving parts and over air suspension systems because of reduced noise and increased convenience, problems are encountered especially where adjustment of the electromagnetically created suspension force is involved.

Because the entire suspension force is produced by the electric current energizing the electromagnets, the electromagnets must be very large to provide the maximum suspension force at the highest vehicle speeds. Moreover, since the air gaps may vary within wide range depending on vehicle loading, proportionally high energization currents must be switched or varied very rapidly so that complex control devices are necessary. Furthermore, high-power electromagnets may also suffer from hysteresis loss which makes control especially impractical as the size of the controlled electromagnet increases.

OBJECTS OF THE INVENTION

It is the principal object of the present invention to provide an improved controlled electromagnetic suspension having high versatility and efficiency at relatively low capital and operating costs.

Another object of the present invention is to provide a magnetic suspension for the purposes described in which the disadvantages of prior-art systems are obviated.

Still another object of the invention resides in a system for the controlled electromagnetic suspension of a vehicle whereby the size, cost and weight of the controlled electromagnets can be reduced, thereby simultaneously reducing the capacity of the control equipment.

Still another object of the invention is to provide an electromagnetic suspension which is adjustable within a wide range of suspension forces and air-gap widths but, even on failure of the controlled electromagnet system, is capable of providing a minimum predetermined suspension force.

It is also an object of the invention to provide a controlled electromagnetic suspension in which, in spite of a wide range of variation in the magnetic-force output of the controlled elements of the system, the suspension as a whole manifests a certain minimum suspension force.

SUMMARY OF THE INVENTION

According to the principles of the present invention, the magnetic suspension system comprises a support forming a track for a suspended vehicle, an armature rail of magnetically permeable material extending along this track and fixed thereto, an electromagnet on the vehicle having a core confronting the armature and an electromagnet coil on the core and energizable for controlling the spacing between the vehicle and the track in accordance with the vehicle load and hence the magnetic force generated by the suspension, and at least one noncontrolled fixed-field supporting magnet carried by the vehicle and cooperating with the armature so that the total magnetic force generated by the control electromagnet and the noncontrol magnet is the total suspending force.

In spite of the relatively wide variations in the useful load which must be accommodated by a vehicle and in the suspending force which must be adjusted to the vehicle loading, a large part of the suspending force must be present under all operating conditions of the vehicle and this substantially constant suspending force is provided, according to the invention by the uncontrolled supporting magnets. Thus, the control electromagnets can be made much smaller, can be provided in fewer number and can be operated with control circuitry and equipment of smaller dimensions, capacity and cost.

The magnetic field which must be generated by the magnets of the suspension can be given as $\Phi$ and consists of the two components $\Phi_c$ and $\Phi_v$ such that $\Phi = \Phi_c + |\Phi_v|$ where $\Phi_c$ is minimum flux which must be maintained at all times during the operation of the vehicle and $|\Phi_v|$ is the absolute value of the flux contribution of the controlled electromagnetic means. $\Phi_c$ is contributed by the constant or supporting magnetic means. Since only $\Phi_v/\Phi$ is the ratio of control force to the total suspending force, only this fraction of the previously employed electrical energy is now required for the same controlled suspension force. $\Phi_v$, of course, will have an absolute value at least equal to the maximum variation the total field strength must undergo.

According to another feature of the invention, the uncontrolled supporting magnet or magnetic means can be constituted by one or more electromagnets, one or more ferromagnetic (alloy) permanent magnets, or one or more permanent magnets of sintered magnetic materials, the permanent magnetic materials of the latter type being the materials of high magnetic energy product disclosed in the art. Combinations of supporting electromagnets, ferromagnetic alloy magnets and sinter magnets may also be used.

It is preferred to provide on the vehicle of the present invention, permanent magnets since the latter have the advantage that the electric current which must be delivered to the vehicle is less or, for a given electric supply, the useful load of the vehicle can be increased. When the current-supply requirements to the vehicle are reduced, current-carrying rails, the busbars, contact shoes or like systems for transmitting current to the vehicle may be reduced in size and are of lower costs. Any reduction in size of any necessary component of the system leads to a decreased deadload and an increased useful load for a given magnetic force.

According to a particular feature of the present invention, the efficiency of the control electromagnets is increased by associating them with sintered magnetic bodies of such materials as samarium which have a relative permeability of close to one and an approximately linear dependency of the supporting force upon a distance from the armature rail, at least in the useful range. Earlier permanent magnets, whose relative permeability is substantially higher, have a substantially exponential dependency of suspending force upon distance. In other words, an increased distance in a nonlinear exponential-characteristic system will require substantially larger amounts of control energy to reestablish the desired air gap than is the case when the electromagnets are employed with the substantially linear-characteristic of samarium sintered magnets.

It has been found to be advantageous to position the control electromagnets and the uncontrolled supporting magnets such that an air gap is always maintained between the latter and the armature or rail, even when the cores of the electromagnets may contact the latter. This prevents contact adhesion between the nonelectromagnetic supporting magnets and blocking of the system. It will be understood that direct contact of the control electromagnets with the rail does not prove to be a problem because the coil need simply be deenergized for release of the vehicle. Where the field of the permanent magnets can be nullified in whole or in part by electromagnet energization, this technique can be used to prevent adhesion.

As noted earlier, ferromagnetic or alloy-type permanent magnets can be used as the noncontrolled supporting magnets according to the present invention although they are not as advantageous as samarium-type sintered magnets. One of the reasons for this difference is the exponential reduction in magnetic force with increasing distance from the magnet in ferromagnetic alloy systems. The exponential characteristic of the ferromagnetic magnets simply decreases the force factor, when the gap mentioned above is always maintained, to the point that extremely large ferromagnetic structures must be used. Furthermore, the exponential characteristics of such ferromagnetic magnets requires an exponential adjustment of the control electromagnets to compensate for exchanges in the air gap spacing and load and further complicates the system. With samarium-sintered magnets this is not a problem and the energization source for the control electromagnets can have a linear adjustment characteristic.

According to a further feature of the invention, the permanent, noncontrolled suspending magnets are provided within the magnetic field of the control electromagnets, the polarity of the latter being reversible. In this case, the total magnetic field $\Phi = \Phi_c \pm \Phi_r$. The supporting force of the permanent magnets can either be reduced or augmented by the control electromagnets so that adhesion of the permanent magnet system to the armature or rail can be avoided, even when no additional gap is provided between the rail and the magnetic member of the permanent magnet systems. The air gap between the armature rail and the core of the control electromagnet can then be equal to the gap between the rail and the permanent magnets. The algebraic superimposition allows the carrying force of the noncontrolled supporting magnets to be increased still further and again reduces problems in energizing and controlling the control electromagnets. The control electromagnets need not provide any suspending force in their own right but may simply be used to control the suspending force developed by the permanent magnets. The current supplied to the suspended vehicle is thereby reduced to a minimum.

It has also been found to be advantageous to provide control electromagnets and the uncontrolled suspending magnets in alternating relationship in the direction of vehicle travel and in the direction of the length of the vehicle.

DESCRIPTION OF THE DRAWING

The above and other objects, features and advantages of the present invention will become more readily apparent from the following description, reference being made to the accompanying drawing in which.

SPECIFIC DESCRIPTION

Figure 3:
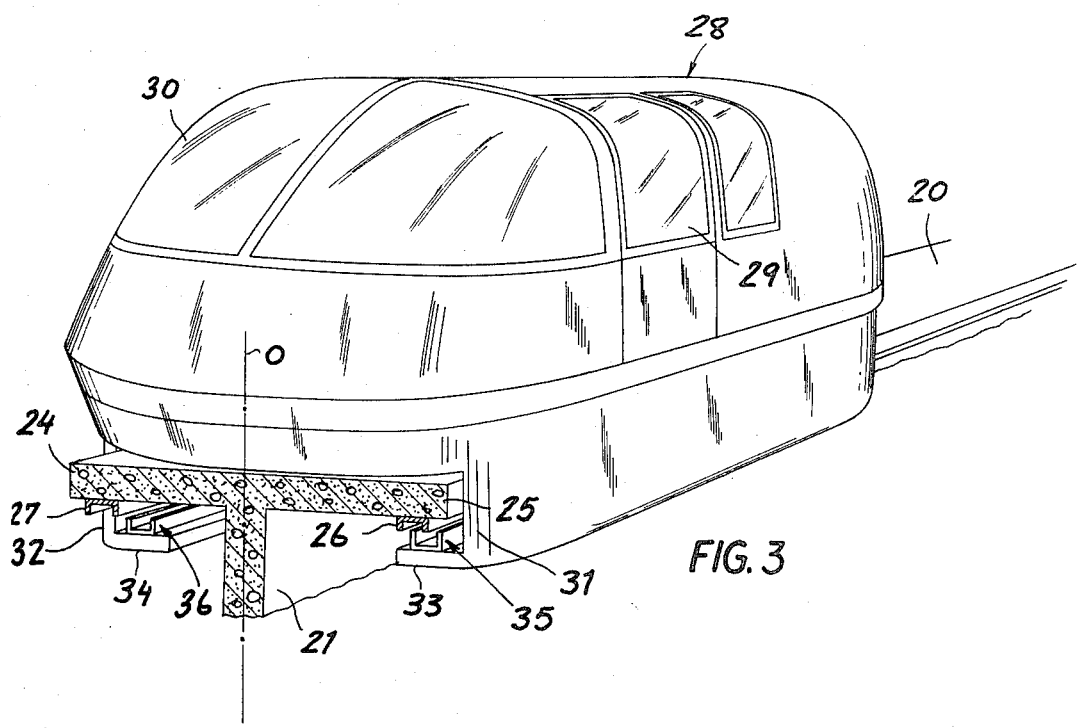
FIG. 3 is a fragmentary perspective view of a magnetic suspension vehicle system embodying the invention.
Figure 4:
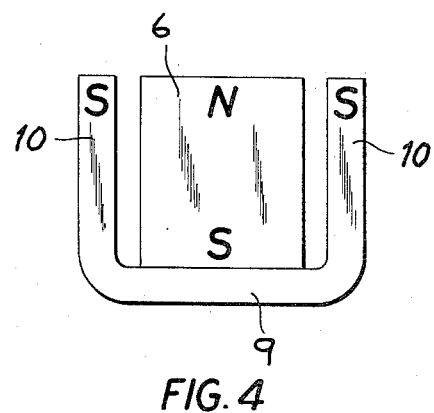
FIG. 4 is a cross section taken along line IV — IV of FIG. 1.
Figure 5:
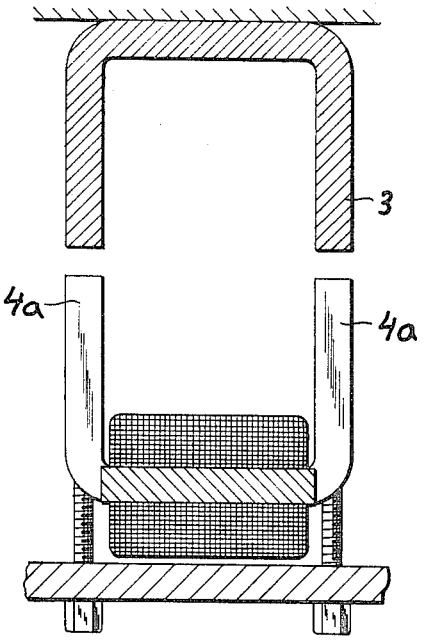
FIG. 5 is a view corresponding to a cross-section along the line V — V through the system of FIG. 1.

Referring first to FIG. 3, it will be seen that a vehicle system of the type embodying the present invention can comprise a track or support system 20, here shown as having a horizontal bed 25 of reinforced concrete supported at intervals by posts or pylons 21 so that the track has a T-shaped configuration.

The vehicle 28 which is magnetically supported on the track, comprises a passenger compartment 29 and, if desired, a control compartment 30 in which the operator of the vehicle may remain.

Figure 1:
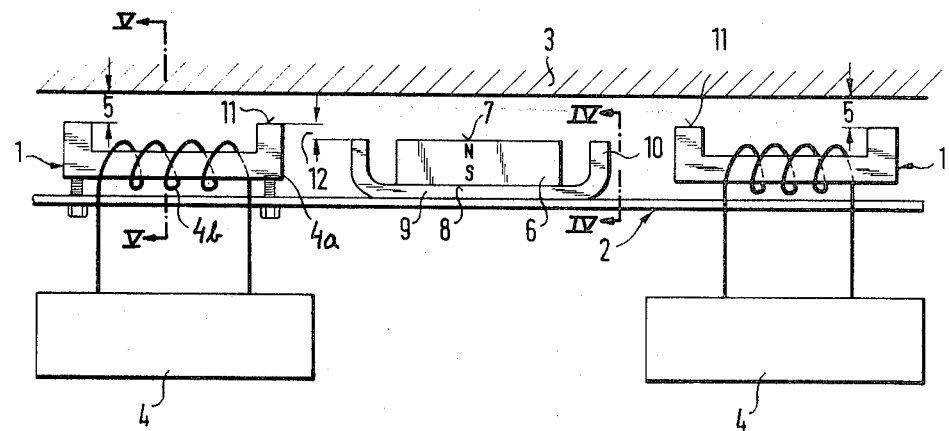
FIG. 1 is a side-elevational view, partly in diagrammatical form, of a magnetic suspending system according to the invention.

The vehicle 28 is provided with a pair of depending aprons 31 and 32 which have inwardly turned horizontal flanges 33 and 34 on which the supporting control and noncontrol magnets are mounted as will be described in connection with FIG. 1 or FIG. 2. The two magnet systems are represented respectively at 35 and 36.

The magnet systems, which lie along respective parallel rows symmetrically on opposite sides of a vertical median plane P through the system, cooperate with magnetically permeable armature rails 26 and 27 mounted on the underside of the arms 24 and 25 of the bed. In operation, the magnetic attraction force is sufficient to suspend the vehicle from the armature rails and maintain an air gap between the two parts of the suspension without adhesion of the vehicle magnets to the armature rail (i.e., without abutting contact of an uncontrolled magnet with the rail or elimination of the vital air gap between the uncontrolled magnet and rail).

The electromagnetic coils are controlled by conventional apparatus (not shown) energized through the delivery of electric current to the vehicle via shoes engaging conductors along the track. The vehicle may be propelled by any conventional means, preferably a linear-induction motor.

Each of the magnet systems of the vehicle disposed on opposite sides of the median plane as noted above comprises a plurality of electromagnets 1 alternating with permanent magnets 6 (uncontrolled magnets) likewise affixed to vehicle body 2. The magnets are located just below a fixed anchor rail 3 of a magnetically permeable material. Each of the electromagnets comprises a yoke or core $4a$ having a central portion surrounded by a coil $4b$, the electromagnet being energized over a control circuit 4 containing a senser for detecting the proximity of the anchor rail to the core and adjusting the core energization accordingly to maintain a constant gap size with the variations in loading of the vehicle or to adjust the gap which in dependence upon vehicle speed. The circuit, using any inductive or other gap-responsive means, e.g., as known in the art for electric discharge machining and employing gap impedance, merely supplies the added electrical energy for controlling the suspension force as will be apparent hereinafter.

To supplement the electromagnetic force in supporting the vehicle 2 upon the armature rail 3, the electromagnets 1 alternate with permanent magnets 6 likewise mounted upon the vehicle and having poles confronting the rail 3. In the embodiment illustrated, one pole face 7 confronts the rail 3 and constitutes the north magnetic pole while the south magnetic pole of the permanent magnet is turned away from the rail 3 but toward a soft-magnetic flux-concentrating and flux-conductive yoke 9 which abuts the magnet 6 at the interface 8. The yoke 9 is provided with a pair of upwardly turned flanges 10 spaced in the longitudinal direction from the magnet 6, which also confront the rail 3 and form south magnetic pole pieces. The yoke 9 reduces the stray magnetic flux arising from the permanent magnet 6.

The permanent magnet 6 is of the samarium sintered-magnet type where a weight of 80 to 90 kg of magnet is able to support a weight of 300 to 400 kg. The force/distance characteristics of this magnet is relatively straight and flat so that a substantial force reduction cannot occur with slight movement of the magnet system away from the rail 3.

The free surface 7 of the permanent magnet is set back from the pole faces 11 of the electromagnet by a distance 12 so that, with a gap spacing 5 between the magnet system and the rail 3, the poles of permanent magnet 6 are at a distance 5 + 12 from the rail. This prevents the permanent magnets from adhering to the rail in contact and ensures a permanent magnet force in all positions of the vehicle.

The permanent magnets which are used in accordance with the present invention can be made by any conventional process and in relatively large sizes, e.g., by laterally and vertically staggering magnetic plates or layers.

Figure 2:
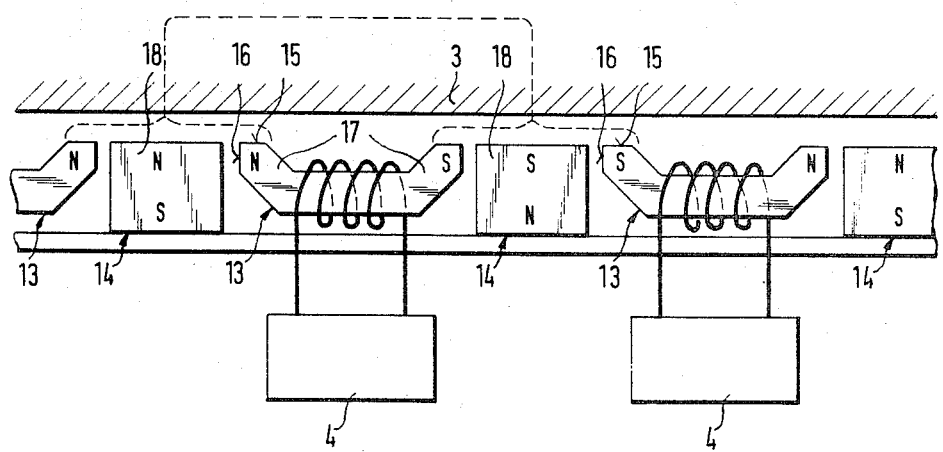
FIG. 2 is a view similar to FIG. 1 illustrating another embodiment of the invention.

In FIG. 2, there is shown an embodiment of the magnetic suspension system in which the electromagnets 13 for controlling the suspension force and the permanent magnets 14 are within the fields of one another. In this system, the supporting bar of the vehicle on which the pole faces of magnets 14 turned away from the rail 3 are mounted, can be of magnetically permeable material to close a flux path between opposing poles of each pair of permanent magnets. The electromagnets 13 may be energized by circuits 4 as described above and, for maximum suspension force, have north magnetic poles reinforcing the permanently north magnetic poles of the permanent magnets 14 and south magnetic poles reinforcing the south magnetic poles of the permanent magnets. A magnetic return path to a region of high south magnetic polarity is represented by broken lines in FIG. 2. When the coils of the permanent magnets 13 are energized in the opposite sense, however, the poles of the electromagnets reverse in polarity or sense to diminish the net north pole character or south pole character in the region 18 of the permanent magnets thereby modifying the suspension force.

In this embodiment, the electromagnets can be reversed in polarity so as to reduce the suspension force $F_s$ of attraction of the magnets to the rail 3 to a point wherein the force is less than the load force $F_L$. The gaps between the electromagnets 13 and permanent magnets 14 and the rail 3 are here the same. When the electromagnets reverse in polarity from the polarity illustrated in FIG. 2, its magnetic circuits are established between the permanent magnets and the electromagnets and do not include the rail 3, thereby reducing any suspension force and preventing adhesion of the magnetic system to the rails.

We claim:

1. A magnetic suspension system comprising:
   an elongated support;
   a magnetically permeable armature rail mounted on said support and extending therealong;
   a supported body; and
   a magnetic means on said supported body juxtaposed with said rail and magnetically attracting same to suspend said body from said rail, said magnetic means comprising:
   electromagnetic means energizable to attract said body,
   uncontrolled support-magnetic means cooperating with said rail to provide a substantial supporting force for said body, and
   means for controlling said electromagnetic means to adjust the attraction of said magnetic means to said rail.

2. The system defined in claim 1 wherein said uncontrolled magnet is a sinter magnet composed of a samarium-containing material.

3. The system defined in claim 1 wherein said electromagnetic means includes at least one electromagnet and said uncontrolled magnetic means includes a further magnet spaced from said electromagnet along said support, said further magnet having a pole piece spaced from said rail by a distance greater than the distance between the pole pieces of said electromagnet and said rail.

4. The system defined in claim 1 wherein said electromagnetic means consists of a plurality of spaced apart electromagnets energized by a source, said uncontrolled magnetic means including permanent magnets disposed between said electromagnets and in the flux fields thereof, and means for reversing the polarity of said source to selectively add and remove flux at said permanent magnets.

5. The system defined in claim 2 wherein said electromagnetic means and said uncontrolled magnetic means each include respective magnets alternating along said body.

6. The system defined in claim 2 wherein said body is a vehicle and said support is a track, two such rails and respective magnetic means being provided on opposite sides of a median plane between said rails.

7. The system defined in claim 6 wherein said uncontrolled magnetic means includes a sintered-metal permanent magnet.

8. The system defined in claim 7 wherein said permanent magnet is a samarium-containing magnet.

9. The system defined in claim 8 further comprising flux-reinforcing yokes abutting said permanent magnets and confronting said rail.

10. The system defined in claim 9 wherein said permanent magnets and said electromagnets have overlapping-flux-magnetic poles.

* * * * *